Jan. 31, 1967   M. M. SCHACHTER   3,302,023
APPARATUS FOR PRODUCING THREE-DIMENSIONAL
RECORDINGS OF FLUORESCENCE SPECTRA
Filed Feb. 20, 1964

INVENTOR.
MYRON M. SCHACHTER

BY
ATTORNEYS

%PDF heading omitted%

3,302,023
APPARATUS FOR PRODUCING THREE-DIMENSIONAL RECORDINGS OF FLUORESCENCE SPECTRA
Myron M. Schachter, Washington, D.C., assignor to the United States of America as represented by the Administrator of the National Aeronautics and Space Administration
Filed Feb. 20, 1964, Ser. No. 346,356
8 Claims. (Cl. 250—71)

The invention described herein may be manufactured and used by and for the Government of the United States of America for governmental purposes without the payment of any royalties thereon or therefor.

This invention relates generally to spectrophotometers, and more particularly to a spectrophotofluorometer for measuring the fluorescence spectra of trace amounts of carciogenic and non-carcinogenic hydrocarbons and displaying said spectra on a three dimensional graph.

Spectrophotometers have, in recent years, become valuable in the investigation of the properties of various chemical elements and compounds. A knowledge of the propeties of any compound or element is necessary to identity that compound or element. The chemical properties of some of the more recently discovered compounds such as the carcinogens and certain non-carcinogens are very similar, consequently, more sophisticated methods and apparatus are necessary to detect the differences between these compounds. One way of obtaining the necessary information is to measure the light absoption and emission properties of the compounds.

Spectrophotofluorometers have been used extensively for measurements when it is desired to determine the fluorescent properties of compounds in the ultraviolet or near ultraviolet region of light wavelengths. Advantages which are characteristic of the spectrophotofluorometers reside in its ability to be used over a wide range of wavelengths in the ultraviolet region and give accurate results without the use of extremely complex equipment. It provides a relatively simple apparatus for obtaining the fluorescence spectra of the chemical under examination as hereinafter set forth.

A spectrophotofluorometer generally includes a source of ultraviolet light which is dispersed and passed by a monochromator, this first or excitation monochromator contains a ruled grating which is connected to and rotated by a seromotor having a servopotentiometer. The servopotentiometer has an electrical output which is proportional to the position of the grating, the position of the grating determining the wavelength of the light dispersed and passed by the monochromator. By connecting a voltage measuring instrument to this output an accurate indication of the location of the grating can be obtained. The light passed by the excitation monochromator impinges on a solution containing a sample of the material whose fluorescent properties are to be measured. The impinging light is absorbed and then re-emitted by the solution at different wavelengths as more fully described hereinafter. This re-emitted light is dispersed by and passed through a second monochromator, this second or emission monochromator is similar to the excitation monochromator, it is driven by a servomotor having a servopotentiometer whose voltage output is proportional to the position of the monochromator's grating which determines the wavelength of the light dispersed by the monochromator. The output from the emission monochromator impinges on the cathode of a photomultiplier tube whose output is a direct measurement of the intensity of the light impinging thereon.

Therefore, a spectrophotofluorometer basically measures three parameters: the fluorescent intensity of the emitted light from the solution under investigation; the wavelength of the light impinging on the solution; and the wavelength of the light emitted from the solution.

The prior art method of obtaining and recording the fluorescent spectra of a chemical involves plotting the measurements of the voltage output from the photomultiplier tube against either the output from the excitation servopotentiometer or the output from the emission servopotentiometer. By the use of the prior art apparatus two-dimensional graphs of the three spectral characteristics of certain chemicals such as carcinogenic and non-carcinogenic hydrocarbons are obtained.

More specifically, the prior art method of obtaining the foregoing graphs using a spectrophotofluorometer is as follows: a light of a specific wavelength, known as excitation light, was focused on a hydrocarbon sample in solution, by the excitiation monochromator. Then the light emitted from the sample was measured both for intensity by the photomultiplier tube and for wavelength by the emission monochromator. A graph was made of these two measurements, the intensity of the light emitted was plotted against the wavelength of the light emitted. A second graph was obtained by filtering the emitted light through the emission monochromator to only pass one wavelength and measuring the intensity of the light emitted at this wavelength as the wavelength of the excitation light was varied. The monochromators are in effect light filtering means for passing a very narrow band of light. By detecting and plotting fluorescent intensity against either excitation wavelength or emission wavelength, with one being held constant while varying and measuring the other, a total graphical picture of the fluorescent spectra was obtained. It is apparent that for the measurement of complex spectra the recording of a complete series of excitation versus intensity and emission versus intensity graphs is a tedious task. The range of excitation and emission wavelengths of interest are from approximately 2,000 Angstrom units to 8,000 Angstrom units and to obtain sufficient information for this range, which results in an accurate picture of the spectra, a considerable number of recordings and plottings are required. For a complete indication of the total spectra an almost infinite number of graphs would be necessary.

A further disadvantage of the prior art resides in the inbility to display all three variable parameters on one specific set of axis at any specific time. The failure to provide for a three dimensional display method of viewing all the parameters requires than an investigator analyze a multitude of complex graphs to determine the properties of the compounds being investigated either for comparison purposes of for obtaining specific information. Many hydrocarbons are quite similar and only by a thorough investigation of the graphs can their differences be distinguished.

Accordingly, it is an object of the present invention to provide a new and improved method of fluorescence spectra analysis.

Another object of the present invention is to provide a new and improved apparatus for fluorescence spectra measurement.

It is a further object of the present invention to provide a simple method and apparatus for displaying the fluorescence spectra of a solution.

It is also an object of the present invention to provide a simple method and apparatus for displaying the fluorescence spectra of a solution on a three element display means.

It is an additional object of the present invention to provide a simple method and apparatus for displaying the fluorescence spectra of a hydrocarbon solution on an oscilloscope.

The foregoing and other objects are attained in the instant invention by providing an oscilloscope connected in a specific manner to a conventional spectrophotofluorometer of a type well known in the prior art. For example the Aminco-Bowman Model No. D49–55074 Serial 10. Broadly an electrical signal is obtained from the excitation monochromator of the spectrophotofluorometer, which is proportional to the wavelength being passed by said monochromator, and connected to the vertical deflection plates of an oscilloscope. A second electrical signal is obtained from the emission monochromator, which is proportional to the wavelength of the signal passed by said monochromator, and is connected to the horizontal deflection plates of the oscilloscope. A third electrical signal is obtained from the photomultiplier tube, which detects the intensity of the emission spectra, and connected to a trigger amplifier and oscillator which in turn controls the intensity of the beam of the cathode ray tube of the oscilloscope.

In operation both the excitation and the emission monochromators are driven by servomotors having servopotentiometers which generate electrical signals proportional to the location of the respective monochromator dispersion gratings. The location of the gratings determines the wavelength of the light passed by the monochromators. Consequently, the resultant signal on the oscilloscope is at an angle to the horizontal and by having the servomotors turning at slightly different speeds this diagonal line will move across the screen of the cathode ray tube at right angles to itself. The resultant signal appears to be a conventional television raster at an angle which is determined by the magnitude of the signals applied to the horizontal and vertical deflection plates. The magnitude is determined by the intensity of the signal obtained from the excitation and emission monochromators.

By displaying the three foregoing characteristics on the face of the cathode ray tube a fluorograph is obtained which contains information on the chemical composition of the hydrocarbon sample and which can be used to identify the sample. For example, any specific sample will always have the same fluorograph. However, if two hydrocarbon samples are different and even if these differences can not be chemically detected without making a sophisticated analysis they will have different fluorographs.

Besides using the instant invention for the identification of hydrocarbon samples the resultant fluorograph provides additional information. For example, with a hydrocarbon sample two bright areas appear having dimensions proportional to the width of the corresponding spectral band. The coordinates of the centroid for each discrete area are the wavelengths of the excitation and emission maxima. The distance between these bright areas is related to the chemical properties of the hydrocarbon, and provides information as to whether the sample is a carcinogen or non-carcinogen. There are many non-carcinogenic hydrocarbons almost identical in structure to the carcinogens and their distinction at very low levels requires a detailed examination of the fluorescent spectra.

The instant invention contemplates that the fluorograph displayed on the cathode ray tube can be photographed, using for example, a Poloroid Land Camera and very fast film such as 10,000 ASA for a permanent record of the information displayed. By adjusting the voltage level at which the cathode ray tube beam is turned on several photographs at different intensity levels can be obtained. By stacking these photographs a stereofluorograph can be obtained which is a three dimensional display of the location of fluorescent maxima. And by the use of a controllable triggering device, for turning the cathode ray tube off and on, information can be obtained about the intensity of the fluorescent light emitted by the hydrocarbon sample.

It can be readily seen that the instant invention can be adapted to obtain the fluorescent spectra of other compounds and is not limited to hydrocarbons.

Other objects and many of the attendant advantages of the invention will be readily appreciated as the same becomes better understood by reference to the following detailed description when considered in conjunction with the accompanying drawings wherein.

Figure 1:
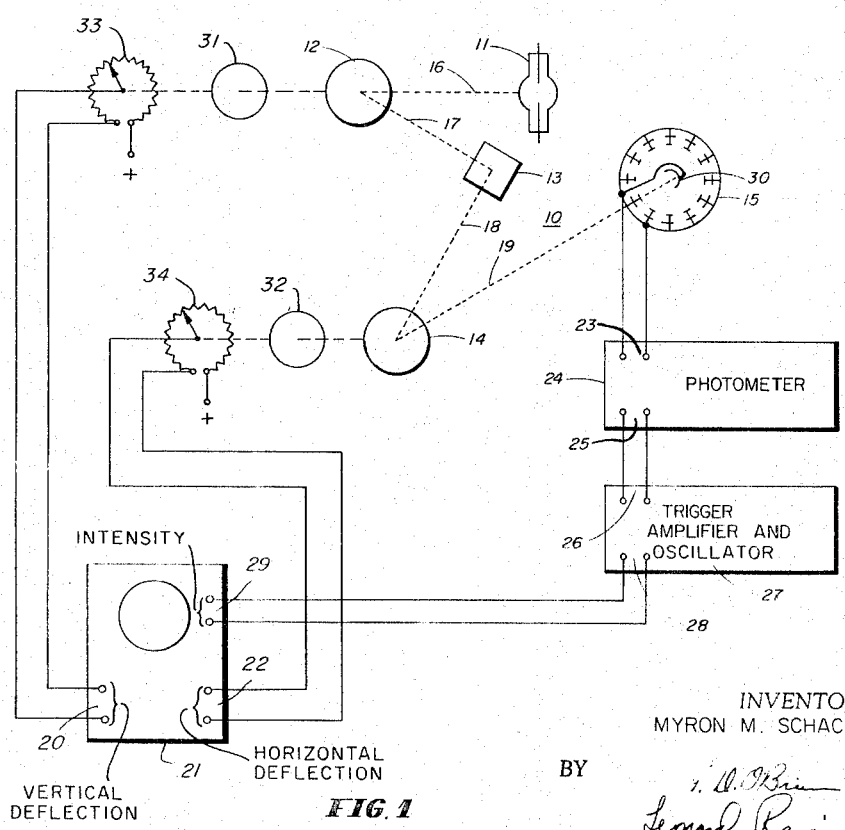
FIG. 1 is a partially schematic and partially block diagram of the improved apparatus of the instant invention.

Referring now to the drawings, in a spectrophotofluorometer 10 such as Aminco-Bowman Model No. D49–55074 Serial 10, is shown in FIG. 1 as comprising a xenon light source 11, an excitation monochromator 12, a hydrocarbon sample in solution 13, an emission monochromator 14, and a photomultiplier tube 15. Light from the xenon light source is focused along a line 16 into the excitation monochromator 12 which disperses the light and focuses a specific wavelength on the hydrocarbon sample 13 along a line 17. The light emitted from the hydrocarbon sample is focused along a line 18 into the emission monochromator 14, which in turn disperses the light and focuses it along a line 19 onto the cathode 30 of the photomultiplier tube 15.

The gratings of the monochromators 12 and 14 are driven by servomotors 31 and 32, respectively having servopotentiometers 33 and 34, respectively generating output voltages which are proportional to the location of the gratings. The servopotentiometer 33 of the excitation monochromator 12 is connected to the vertical deflection plate terminals 20 of the oscilloscope 21. The servopotentiometer 34 of emission monochromator 14 is connected to the horizontal deflection plate terminals 22 of the oscilloscope 21.

The output from the photomultiplier tube is connected to the input terminals 23 of the photometer 24. The output terminals 25 of the photometer 24 are connected to the input terminals 26 of the trigger amplifier and oscillator 27. The output terminals 28 of the trigger amplifier and oscillator 27 are connected to the grid intensity control terminals 29 of the oscilloscope 21.

The system disclosed in FIG. 1 operates as follows: xenon light source 11 generates light with wavelengths that include the ultraviolet spectrum. The light from the xenon light source 11 is focused along a line 16 into the excitation monochromator 12 wherein it is dispersed by the monochromators grating. The servopotentiometer 33 of the excitation monochromator 12 is calibrated with and connected to control the vertical deflection of oscilloscope 21. The calibration is such that specific increments of vertical deflection of the oscilloscope are proportional to changes in the wavelength of the ultraviolet light dispersed and passed by the excitation monochromator 12. Consequently, when the vertical deflection of the cathode ray tube beam changes by a specific increment it can be equated to the change in wavelength passed by the excitation monochromator 12.

The excitation monochromator 12 disperses light that is generated by the xenon source 11 and contains a movable grating which allows only a very narrow band of wavelengths in the ultraviolet region to be passed therethrough. Consequently, the output from the excitation monochromator 12 is a very narrow band of ultraviolet light. This narrow band of ultraviolet light passes along a line 17 and impinges on the hydrocarbon sample 13. The hydrocarbon sample 13 absorbs this narrow band of ultraviolet light and in turn generates ultraviolet light of different wavelengths. This is caused by the interrelationship of the electrons and their ability to move from one energy level to another. The light impinging on the sample causes the electrons to absorb certain amounts of energy in the form of light which causes them to move to higher energy levels. Immediately these electrons attempt to return to lower energy levels and in so doing emit energy as light but at different wavelengths. Also, some of the energy absorbed by the sample is emitted as other types of energy, such as heat. The light emitted from the hydrocarbon sample passes along a line 18 and impinges the emission monochromator 14.

The output from the servopotentiometer 34 of the emission monochromator 14 which is proportional to the position of the grating is connected to the horizontal deflection plate terminals 22 of the oscilloscope 21 and operates in a manner similar to that of the excitation monochromator 12 which is connected to the vertical deflection plate terminals 20 of the oscilloscope 21. The horizontal deflection of the cathode ray beam is calibrated such that its location is a measurement of the light passing through the emission monochromator and servopotentiometer 14.

The emission monochromator 14 is identical to the excitation monochromator 12. It has a grating which disperses and passes light only over a narrow band of wavelengths in the ultraviolet region. The location of the narrow band with regard to wavelength depends upon the location of the grating.

The output from the emission monochromator 14 passes along a line 19 and impinges on the cathode 30 of a photomultiplier tube 15. The photomultiplier tube 15 operates in a conventional manner, it amplified the electron current from the cathode which is proportional to the light impinging thereon. The photomultiplier tube 15 is connected to a photometer 24 which measures the current output and is thereby indicative of the intensity of the light impinging on the cathode 30 of the photomultiplier tube 15. The photometer 24 is an ammeter for measuring the current output from the photomultiplier tube 15 graduated in terms of light intensity.

The output from the photometer 24 is connected to a trigger-amplifier and oscillator 27 which operates in a manner more fully described below. When the output from the emission monochromator reaches a specific level the trigger amplifier and oscillator 27 generate output pulses which are applied to the intensity grid control 29 of the oscilloscope 21. Consequently, whether the cathode ray tube electron beam is on or off is an indication of the intensity level of the light passed by the emission monochromator 14 and detected by the photomultiplier tube 15. By controlling the trigger level of the trigger amplifier and oscillator 27 the intensity level necessary to turn the cathode ray tube beam on can be controlled and measured.

Figure 2:
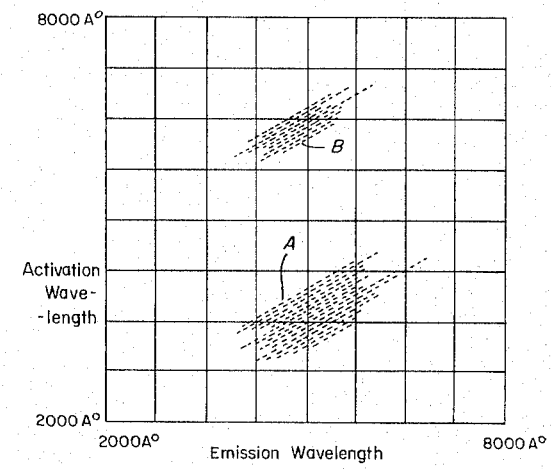
FIG. 2 is an example of the type of fluorographs obtained by the instant invention.

FIG. 2 is an example of the type of information displayed on the face of the cathode ray tube of oscilloscope 21. The beam sweeps along a diagonal which is controlled by the excitation monochromator 12 for vertical deflection and the emission monochromator 14 for horizontal deflection. By having the servomotors driving the monochromators rotating at slightly different speeds the diagonal line will move across the screen as a raster type signal and will not be repetitious along one line. FIG. 2 shows two maxima areas of light intensity displayed on the face of the tube. These areas which are above the level necessary to turn on the trigger amplifier and oscillator 27 and obtain output pulses therefrom, designated A and B, identify the hydrocarbon sample. They represent the location of emission intensity maxima and the excitation and emission wavelengths at which these maxima occur. All hydrocarbons of the same composition will have the same fluorograph displayed. Conversely, hydrocarbons having all the same apparent chemical properties but having different structures, will have different fluorographs because of their structural differences. The fluorographs will have different maxima located at different positions. Consequently, the instant invention provides a unique way of identifying hydrocarbons samples without going through involved complex chemical and physical property tests.

One of the important advantages of the instant invention is that it provides a unique way of determining whether a hydrocarbon sample is or is not chemically reactive to light. Generally, a hydrocarbon sample will have two specific areas where the emission maximas occur. The distance, which represents the location of the maximas in excitation and emission wavelengths, between these two areas, A and B, indicate whether or not the hydrocarbon is chemically reactive to light. The closer the areas are together the more chemically reactive is the hydrocarbon sample.

Figure 3:
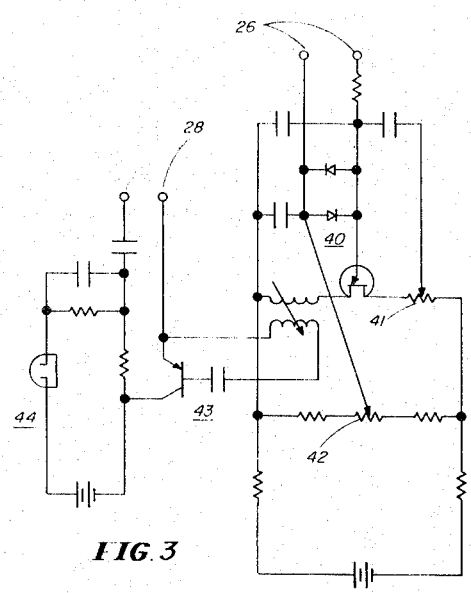
FIG. 3 is a circuit diagram of a typical trigger amplifier and oscillator for use in the instant invention.

FIG. 3 discloses one type of trigger amplifier and oscillator 27 adequate to perform the triggering function for the instant invention. The circuit consists of a unijunction oscillator 40. The setting of two potentiometers 41 and 42 determine the amount of input voltage necessary to make the circuit oscillate. The output from the unijunction oscillator 40 is connected to a common emitter amplifier 43 whose output in turn is connected to a neon chopper circuit 44. The output from the chopper circuit 44 is connected to the intensity control terminals 29 of the cathode ray tube of the oscilloscope 21. When the output from the emission monochromator reaches a specific level it will turn the unijunction oscillator circuit 40 on which will in turn provide a signal to the common emitter amplifier 43 which will then allow pulses from neon chopper circuit 44 to be applied to the cathode ray tube grid circuit. The circuit shown in FIG. 3 is conventional and any low level trigger amplifier and oscillator circuit that will detect the output from the photometer and generate the required voltage to control the intensity of the cathode ray tube beam when it reaches a certain level will be adequate.

By photographing the picture displayed on the face of the tube a permanent record of the information contained in the display at the level, determined by the settings of the potentiometers 41 and 42 of the trigger amplifier and oscillator 27, can be obtained. By varying the setting of the two potentiometers, 41 and 42 displays at different levels can be obtained. By taking photographs of the displays at different intensity levels and stacking the photographs according to the intensity levels at which they were taken, stereofluorographs are obtained which give an accurate three dimensional view of the peak or maximas of the hydrocarbon under test.

It is evident that the instant invention disclosure provides a method and apparatus which displays the fluorescence spectral parameters of a compound to produce in effect a "stereofingerprint" of fluorescent substances. It delineates not only activation and emission wavelength and emission intensity, but also for each peak the stereoenvelope (when the fluorographs are stacked) of the spectral bands for the two fundamental parameters of excitation and emission. Accordingly, it permits a unique characterization of very closely related structures.

Obviously, numerous modifications and variations of the present invention are possible in the light of the above teachings. For example, by aligning two spectrophotofluorometers with regard to excitation and emission monochromators and applying the outputs to a dual beam scope a comparison of two samples can be displayed. The intensity of the light emitted by one sample controlling the first beam and the intensity of the light emitted by the second sample controlling the second beam.

An additional example of an obvious modification is to insert a level sensing device after the photometer wherein a voltage is only passed when it is within a predetermined narrow range. This results in more accurate knowledge of the information displayed. Rather than knowing that the signal is only above the level necessary to turn on the trigger amplifier and oscillator it is now

I claim:

1. Apparatus for displaying the fluorescence spectra of a polynuclear hydrocarbon on the face of the cathode ray tube of an oscilloscope which has inputs for controlling the vertical deflection, the horizontal deflection, and the intensity of the cathode ray tube beam comprising: a broad spectrum light source; an oscilloscope; a first filter for passing light from said source and having a second output which is an electrical signal proportional to the wavelength of a light passed therethrough; said second output of said first filter means being connected to the vertical deflection plates of said oscilloscope; a polynuclear hydrocarbon solution; said polynuclear hydrocarbon solution located so as to be in the beam of light passed through the said first filter means; a second filter means located so as to intercept the light emitted by said polynuclear hydrocarbon solution; said second filter means having a second output which is an electrical signal proportional to the wavelength of the light passed therethrough; said second output of said second filter means being connected to the horizontal deflection plates of said oscilloscope said second outputs of said first and second filters being both continuously and simultaneously variable; a light intensity detecting means connected so as to intercept the light output from said second filter means; said light intensity detecting means having an output which is proportional to the light intercepted; the output from said light intensity detecting means being connected to the intensity control of the oscilloscope for controlling the intensity of the electron beam of the oscilloscope whereby the wavelength of the excitation and the emission light from said polynuclear hydrocarbon control the position of the electron beam of the oscilloscope and the output from the light intensity detecting means controls the intensity of the electron beam of the oscilloscope all of which are dependent upon the physical characteristics of the hydrocarbon sample.

2. Apparatus as described in claim 1 wherein the first and second filter means are monochromators.

3. Apparatus as described in claim 2 wherein the light source provides light in the ultraviolet region.

4. Apparatus as described in claim 3 wherein the ultraviolet light source is a xenon source.

5. Apparatus as described in claim 4 wherein the light intensity detecting means is a photomultiplier tube.

6. Apparatus as described in claim 5 wherein a trigger amplifier and oscillator is connected between said photomultiplier tube and the control grid of the oscilloscope for turning the cathode ray tube beam on only when the intensity of the emitted light is above a predetermined level.

7. Apparatus as described in claim 6 wherein a photometer is connected between the photomultiplier tube and the trigger amplifier and oscillator for measuring the intensity of the emitted light.

8. Apparatus as described in claim 7 wherein means are provided to photograph the optical output of said oscilloscope.

References Cited by the Examiner

UNITED STATES PATENTS

| | | | |
|---|---|---|---|
| 2,853,619 | 9/1958 | De Witt | 250—71 X |
| 2,971,429 | 2/1961 | Howerton | 250—71 X |
| 3,092,722 | 6/1963 | Howerton | 250—77 |
| 3,159,744 | 12/1964 | Stickney et al. | 250—71.5 |

RALPH G. NILSON, *Primary Examiner.*

ARCHIE R. BORCHELT, *Examiner.*